US009982553B2

United States Patent
Miller (10) Patent No.: US 9,982,553 B2
(45) Date of Patent: May 29, 2018

(54) SEAL ASSEMBLY INCLUDING A NOTCHED SEAL ELEMENT FOR ARRANGING BETWEEN A STATOR AND A ROTOR

(71) Applicant: United Technologies Corporation, Hartford, CT (US)

(72) Inventor: Jonathan L. Miller, Ware, MA (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 14/771,964

(22) PCT Filed: Jan. 6, 2014

(86) PCT No.: PCT/US2014/010341
§ 371 (c)(1),
(2) Date: Sep. 1, 2015

(87) PCT Pub. No.: WO2014/158294
PCT Pub. Date: Oct. 2, 2014

(65) Prior Publication Data
US 2016/0010483 A1    Jan. 14, 2016

Related U.S. Application Data

(60) Provisional application No. 61/773,539, filed on Mar. 6, 2013.

(51) Int. Cl.
| F16J 15/44 | (2006.01) |
| F01D 11/08 | (2006.01) |
| F02C 7/28  | (2006.01) |
| F01D 11/00 | (2006.01) |
| F16J 15/26 | (2006.01) |

(Continued)

(52) U.S. Cl.
CPC ............ *F01D 11/08* (2013.01); *F01D 11/003* (2013.01); *F02C 7/28* (2013.01); *F04D 29/10* (2013.01); *F16J 15/26* (2013.01); *F16J 15/30* (2013.01); *F05D 2220/32* (2013.01); *F05D 2240/55* (2013.01); *F05D 2250/182* (2013.01); *F05D 2260/38* (2013.01)

(58) Field of Classification Search
CPC .................................. F16J 15/32; F16J 15/38
See application file for complete search history.

(56) References Cited

U.S. PATENT DOCUMENTS 2,908,516 A * 10/1959 Stein ........................ F16J 15/30
                                                                277/548
3,575,424 A    4/1971 Taschenberg
(Continued)

OTHER PUBLICATIONS

Extended EP Search Report dated Jun. 7, 2016.
International Search Report for PCT/US2014/010341 dated Oct. 27, 2014.

*Primary Examiner* — Gilbert Y Lee
(74) *Attorney, Agent, or Firm* — O'Shea Getz P.C.

(57) ABSTRACT

A seal assembly with an axis is provided that includes a rotor and a seal element that is connected to a stator with an anti-rotation element. The seal element includes a first element surface, a second element surface and an annular notch. The first element surface axially engages the stator. The second element surface radially engages the rotor. The notch extends into the seal element between the first and the second element surfaces. The stator radially overlaps a portion of the notch.

20 Claims, 6 Drawing Sheets

(51) Int. Cl.
*F16J 15/30* (2006.01)
*F04D 29/10* (2006.01)

(56) References Cited

U.S. PATENT DOCUMENTS

| | | | | |
|---|---|---|---|---|
| 4,094,513 | A * | 6/1978 | Kime | F16J 15/3404 |
| | | | | 277/366 |
| 4,591,167 | A * | 5/1986 | Vossieck | F16J 15/36 |
| | | | | 264/299 |
| 5,014,999 | A * | 5/1991 | Makhobey | F01D 11/003 |
| | | | | 277/422 |
| 5,217,232 | A | 6/1993 | Makhobey | |
| 5,558,341 | A * | 9/1996 | McNickle | F16J 15/3488 |
| | | | | 277/400 |
| 5,865,441 | A * | 2/1999 | Orlowski | F16J 15/3404 |
| | | | | 277/364 |
| 6,338,490 | B1 | 1/2002 | Bainachi | |
| 8,167,314 | B2 | 5/2012 | Ullah | |
| 2003/0071422 | A1 | 4/2003 | Holder | |
| 2011/0233871 | A1 | 9/2011 | Davis | |

\* cited by examiner

SEAL ASSEMBLY INCLUDING A NOTCHED SEAL ELEMENT FOR ARRANGING BETWEEN A STATOR AND A ROTOR

This application claims priority to PCT Patent Application No. PCT/US14/10341 filed Jan. 6, 2014, which claims priority to U.S. Patent Appln. No. 61/773,539 filed Mar. 6, 2013.

This invention was made with government support under Contract Nos. FF33657-99-D-2051-0019 and F33657-99-D-2051-0021 awarded by the United States Air Force. The government may have certain rights in the invention.

BACKGROUND OF THE INVENTION

1. Technical Field

This disclosure relates generally to rotational equipment and, more particularly, to a seal assembly for arranging between a stator and a rotor of, for example, a turbine engine.

2. Background Information

A seal assembly is typically used in rotational equipment to provide a seal between regions of high and low fluid pressure and/or temperature. A seal assembly may be used, for example, to provide a gas and/or liquid seal between a stator and a rotor of a turbine engine, a pump, a compressor, a turbine of a hydro-electric or wind generator, as well as various other types of rotational equipment.

Figure 1:
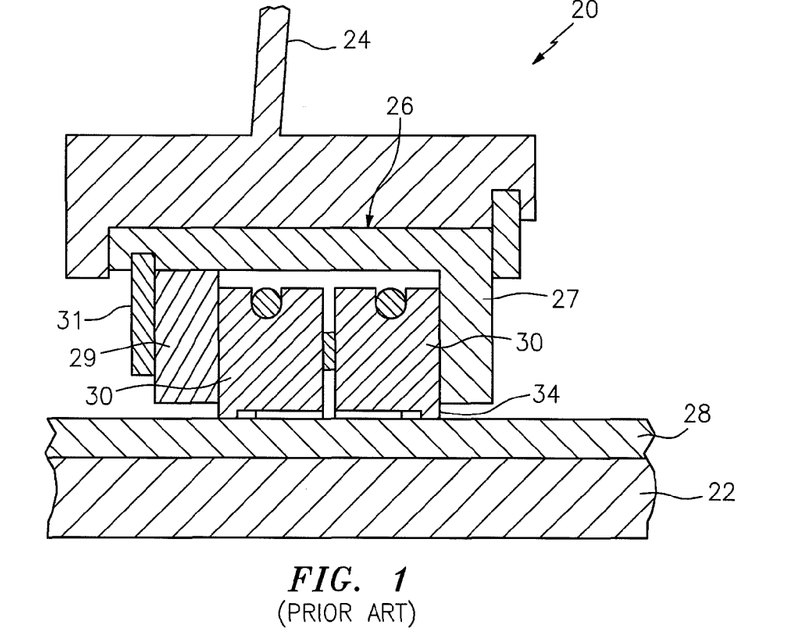
FIG. 1 is a sectional illustration of a prior art seal assembly for a turbine engine.

FIG. 1 illustrates a sectional illustration of a seal assembly 20 for sealing a gap between a turbine engine shaft 22 and a strut 24 connected to a turbine engine case. The seal assembly 20 includes an annular seal housing 26, an annular shaft sleeve 28 and a pair of annular carbon seal elements 30. The seal housing 26 includes a housing sleeve 27 and a housing insert 29, which is connected to the housing sleeve 27 with a retaining ring 31. The housing sleeve 27 is connected to the strut 24. The shaft sleeve 28 is mounted onto the shaft 22. The seal elements 30 are arranged within and axially contact the seal housing 26. The seal elements 30 radially contact the shaft sleeve 28.

Figure 2:
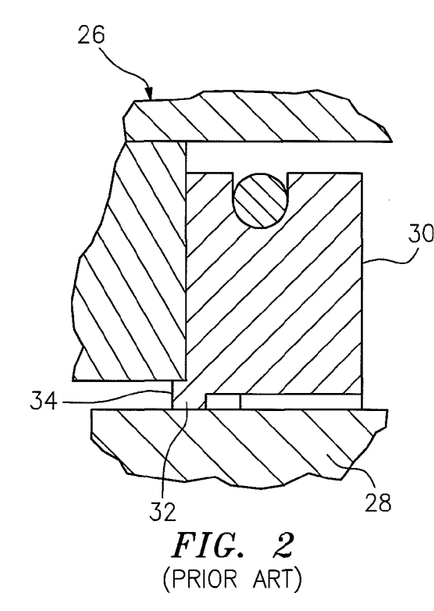
FIG. 2 is an enlarged sectional illustration of a portion of the seal assembly of FIG. 1 in a worn condition.
Figure 3:
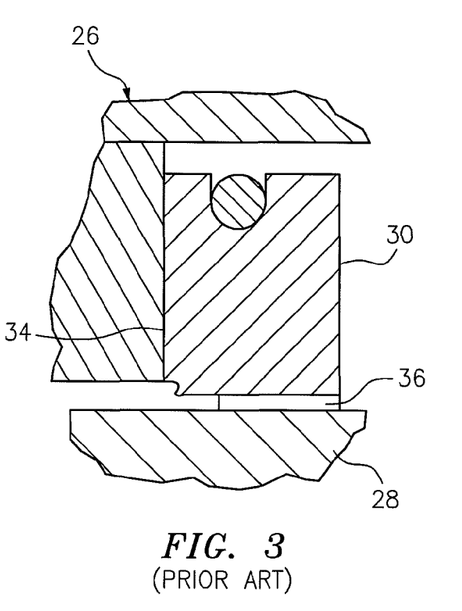
FIG. 3 is an enlarged sectional illustration of a portion of the seal assembly of FIG. 1 in a fractured condition.

The shaft sleeve 28 rotates with the shaft 22 during turbine engine operation. Under certain conditions, shaft runout may cause the shaft sleeve 28 and, thus, the seal elements 30 to radially shift relative to the seal housing 26. Referring to FIG. 2, the radial shifting between each seal element 30 and the seal housing 26 may create an arcuate or annular step 32 in an end 34 of the seal element 30. Referring now to FIG. 3, this step 32 may fracture during turbine engine operation and increase fluid leakage between the now fractured seal element 30 and the shaft sleeve 28 by providing, for example, a direct leakage passage through axial channels 36.

There is a need in the art for an improved seal assembly.

SUMMARY OF THE DISCLOSURE

According to an aspect of the invention, a seal assembly with an axis is provided that includes a rotor and an annular seal element that is connected to a stator with an anti-rotation element. The seal element includes a first element surface, a second element surface and an annular notch. The first element surface axially engages the stator, and the second element surface radially engages the rotor. The notch extends into a corner of the seal element between the first and the second element surfaces. The stator radially overlaps a portion of the notch.

According to another aspect of the invention, another seal assembly with an axis is provided that includes a rotor and a seal element connected to a stator with an anti-rotation element. The seal element includes an annular first element surface, an annular second element surface and an annular notch. The first element surface axially engages a surface of the stator. The second element surface radially engages the rotor. The notch extends into the seal element adjacent to respective ends of the first and the second element surfaces. The stator surface extends radially beyond ends of the first element surface.

According to still another aspect of the invention, a seal assembly is provided for a turbine engine. The seal assembly includes a stator such as a seal housing, a rotor and a seal element. The rotor is mounted to a turbine engine shaft that rotates around an axis. The seal element extends circumferentially about the axis and is connected to the seal housing with an anti-rotation element. The seal element includes a first element surface, a second element surface and a notch. The first element surface axially contacts the seal housing. The second element surface radially contacts the rotor. The notch extends circumferentially about the axis and into the seal element between and adjacent to respective ends of the first and the second element surfaces. The seal housing radially overlaps a portion of the notch.

The stator may include a stator surface that axially engages (e.g., contacts) the first element surface and extends radially beyond ends of the first element surface.

The stator may include a stator surface that extends radially inwards to an inner end having a first radius. The first element surface may axially engage the stator surface, and extend radially inwards to an inner end having a second radius that is greater than the first radius.

The notch may be at least partially formed by a first notch surface that extends axially from an end of the first element surface towards the second element surface. The notch may also be at least partially formed by a second notch surface that extends radially from an end of the second element surface towards the first notch surface. The first and the second notch surfaces may form the notch with a substantially rectangular cross-sectional geometry.

The notch may be at least partially formed by a first notch surface and a second notch surface. The first notch surface may be substantially perpendicular (or angled) to the second notch surface, and extend axially away from the first element surface towards the second notch surface. The second notch surface may extend radially away from the second element surface towards the first notch surface.

The seal element may shift radially relative to the stator. The seal element may also or alternatively shift circumferentially relative to the stator. Alternatively, the seal element may be circumferentially fixed relative to the stator.

The seal element may extend axially between opposing element ends and radially from an inner element side to an outer element side. The first element surface may be located at one of the element ends. The second element surface may be located at the inner element side.

The stator may be or include an annular stator that extends circumferentially around and is radially separated from the rotor. The stator may be, for example, a turbine engine seal housing within which the seal element is arranged.

The seal assembly may include a turbine engine shaft on which the rotor (e.g., a sleeve) is mounted.

The seal element may include a plurality of arcuate seal element segments. Alternatively, the seal element may be configured as a unitary body.

The anti-rotation element may include a protrusion that extends axially into an aperture. The protrusion may be configured with the stator, and the aperture may be configured with the seal element. Alternatively, the protrusion may be configured with the seal element, and the aperture may be configured with the stator.

The seal assembly may include a (e.g., annular) second seal element connected to the stator with an anti-rotation element. The second seal element may include a first element surface, a second element surface and a notch. The first element surface of the second seal element may axially engage the stator. The second element surface of the second seal element may radially engage the rotor. The notch of the second seal element may extend into a corner of the second seal element between the respective first and second element surfaces.

The foregoing features and the operation of the invention will become more apparent in light of the following description and the accompanying drawings.

DETAILED DESCRIPTION OF THE INVENTION

Figure 4:
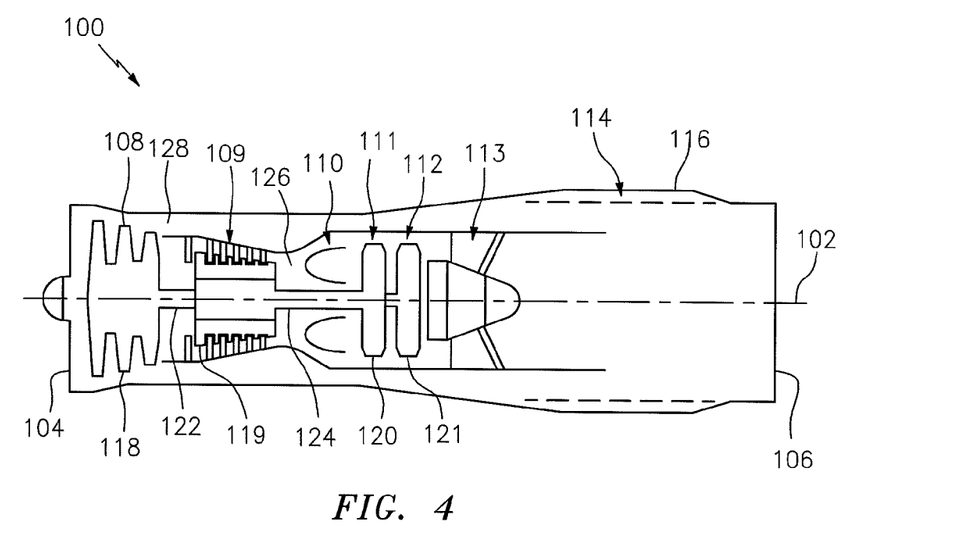
FIG. 4 is a sectional illustration of a turbine engine.

FIG. 4 is a sectional illustration of a turbine engine 100 that extends along an axis 102 between an airflow inlet 104 and an airflow exhaust 106. The engine 100 includes a fan or low pressure compressor (LPC) section 108, a high pressure compressor (HPC) section 109, a combustor section 110, a high pressure turbine (HPT) section 111, a low pressure turbine (LPT) section 112, an augmentor section 113 and a nozzle section 114. These engine sections 108-114 are arranged sequentially along the axis 102 and housed within an engine case 116. Each of the engine sections 108, 109, 111 and 112 includes a respective rotor 118-121. Each of the rotors 118-121 includes a plurality of rotor blades arranged circumferentially around and connected (e.g., mechanically fastened, welded, brazed or otherwise adhered) to one or more respective rotor disks. The fan (or LPC) rotor 118 is connected to and driven by the LPT rotor 121 through a low speed shaft 122. The HPC rotor 119 is connected to and driven by the HPT rotor 120 through a high speed shaft 124.

Air enters the engine 100 through the airflow inlet 104, and is directed through the fan section 108 and into an annular core gas path 126 and an annular bypass gas path 128. The air within the core gas path 126 may be referred to as "core air". The air within the bypass gas path 128 may be referred to as "bypass air" or "cooling air". The core air is directed through the engine sections 109-114 and exits the engine 100 through the airflow exhaust 106. Within the combustion section 110 and the augmentor section 113, fuel is injected into and mixed with the core air and ignited to provide forward engine thrust. The bypass air may be utilized to cool various turbine engine components within one or more of the engine sections 109-114.

Figure 5:
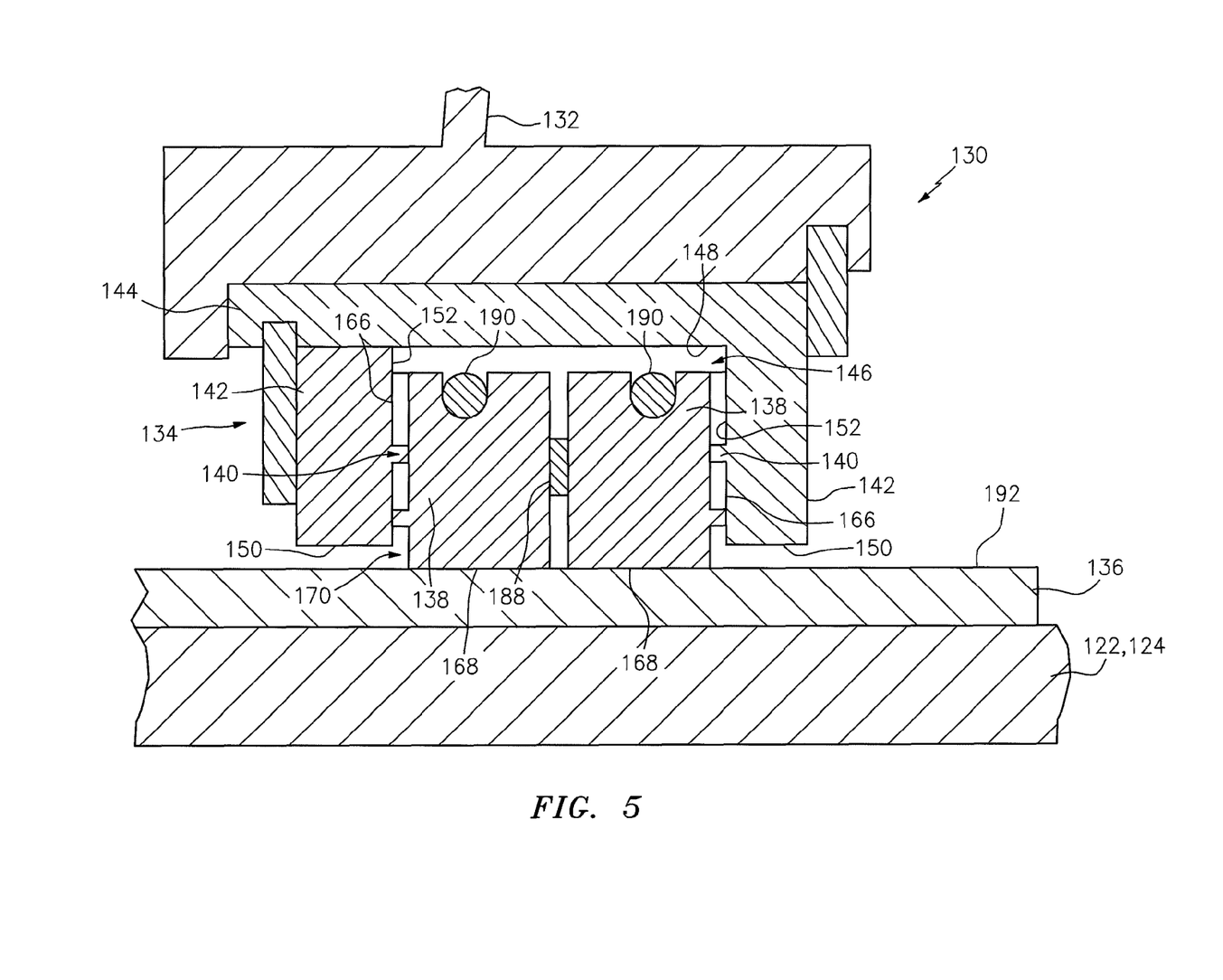
FIG. 5 is a sectional illustration of a seal assembly for the turbine engine of FIG. 4.

FIG. 5 is a sectional illustration of a seal assembly 130 for sealing a gap between one of the shafts 122 and 124 and a strut 132 connected to the engine case 116. The seal assembly 130 includes a stator 134 (e.g., an annular metal seal housing), a rotor 136 (e.g., an annular metal sleeve), one or more seal elements 138 (e.g., annular carbon seal elements), and one or more anti-rotation elements 140.

Figure 6:
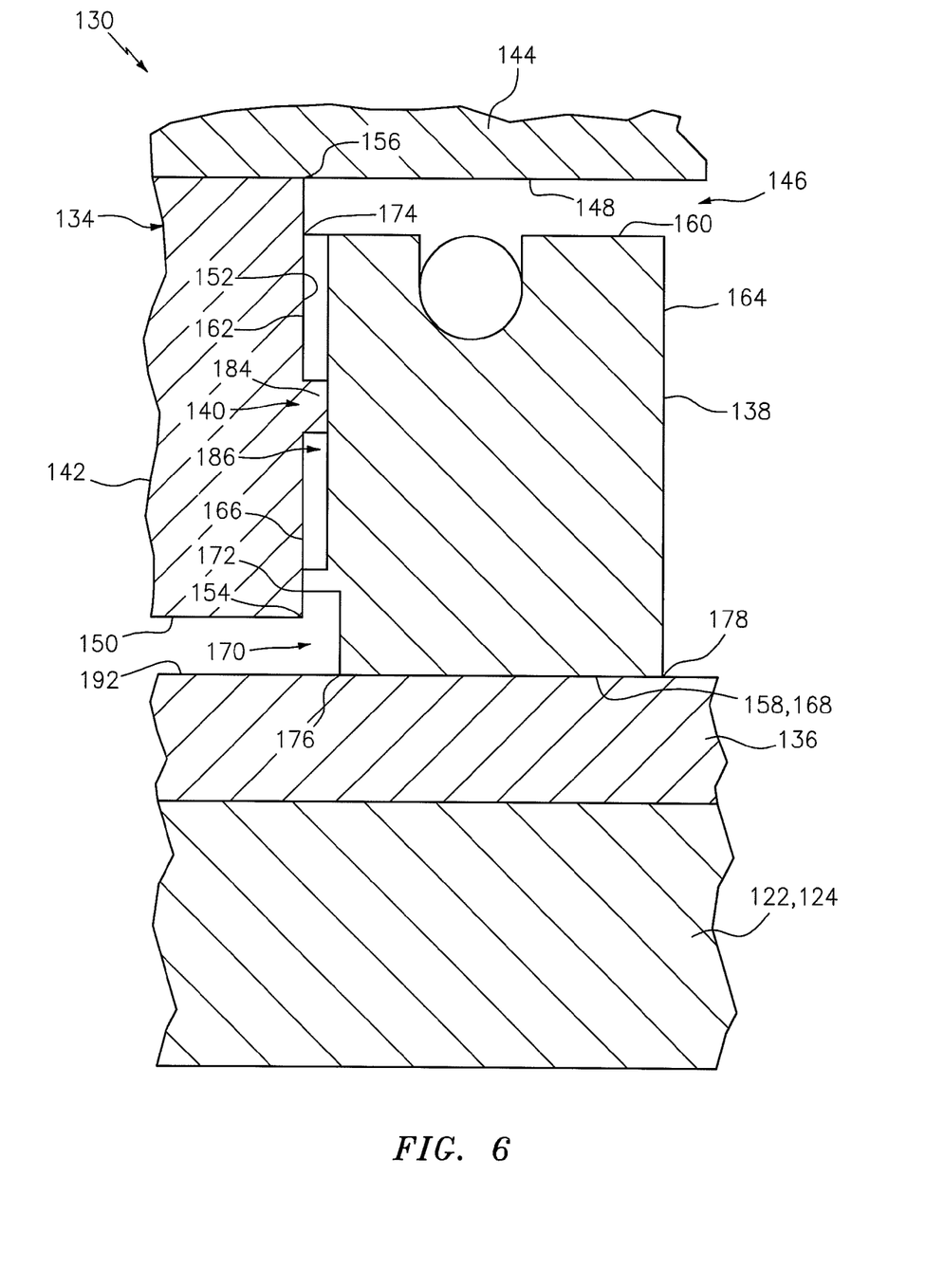
FIG. 6 is an enlarged sectional illustration of a portion of the seal assembly of FIG. 5.

The stator 134 includes a pair of endwalls 142, a base 144 and an annular channel 146. Each of the endwalls 142 extends radially inwards from an inner surface 148 of the base 144 to an inner side 150. Referring to FIG. 6, each of the endwalls 142 includes a stator surface 152 (e.g., an annular seal surface) that extends radially between an inner end 154 and an outer end 156. The inner end 154 is arranged at (e.g., on, adjacent or proximate) the inner side 150. The outer end 156 may be arranged at an intersection between the respective endwall 142 and the inner surface 148. Referring again to FIG. 5, the channel 146 extends axially within the stator 134 between the stator surfaces 152. The channel 146 extends radially into the stator 134 from the inner sides 150 to the inner surface 148.

Figure 7:
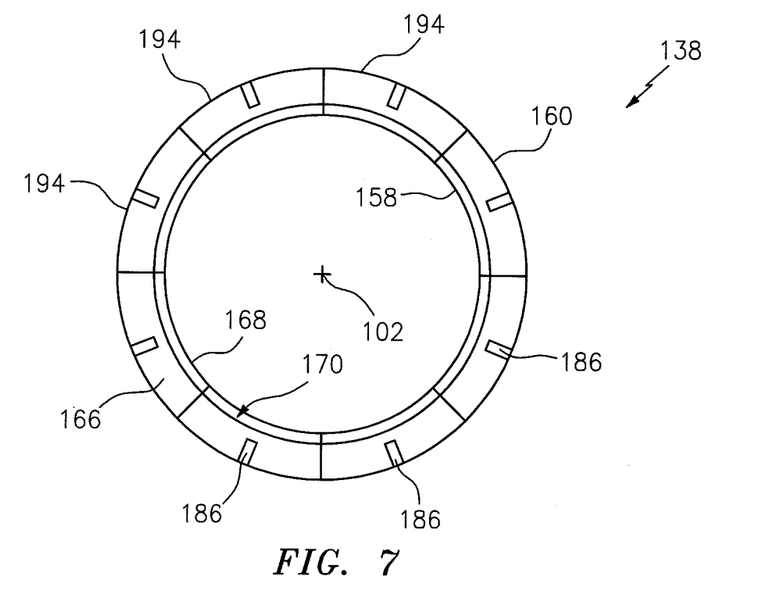
FIG. 7 is an illustration of an end of a seal element for the seal assembly of FIG. 5 with a segmented body.
Figure 8:
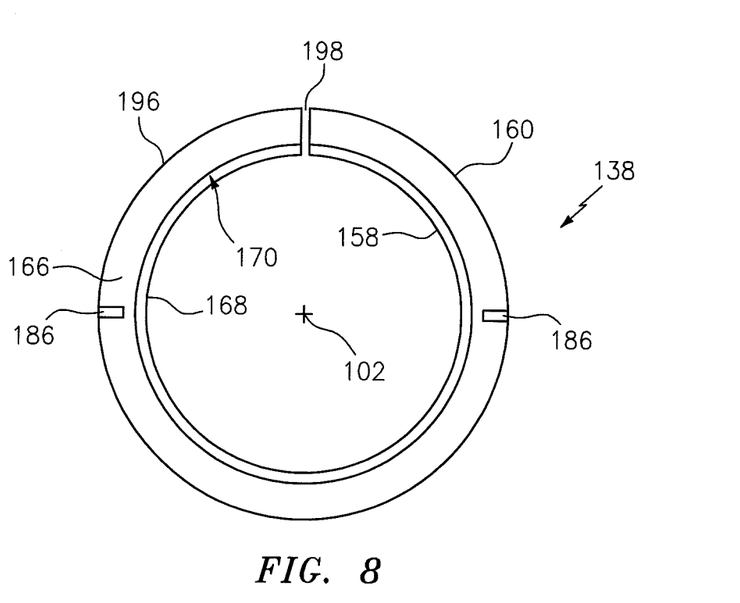
FIG. 8 is an illustration of an end of a seal element for the seal assembly of FIG. 5 with a unitary body.

Referring to FIGS. 7 and 8, each of the seal elements 138 extends circumferentially around the axis 102. Each of the seal elements 138 extends radially between an inner element side 158 and an outer element side 160. Referring now to FIG. 6, each of the seal elements 138 extends axially between opposing element ends 162 and 164.

Each of the seal elements 138 includes a plurality of element surfaces 166 and 168 (e.g., annular seal surfaces) and a notch 170 (e.g., an annular relief cut). The first element surface 166 is located at the first element end 162. The first element surface 166 extends radially between an inner end 172 and an outer end 174. The inner end 172 has a radius that is greater than a radius of the inner end 154. The second element surface 168 is located at the inner element side 158. The second element surface 168 extends axially, in a direction away from the first element surface 166, respectively between a first end 176 and a second end 178.

Figure 9:
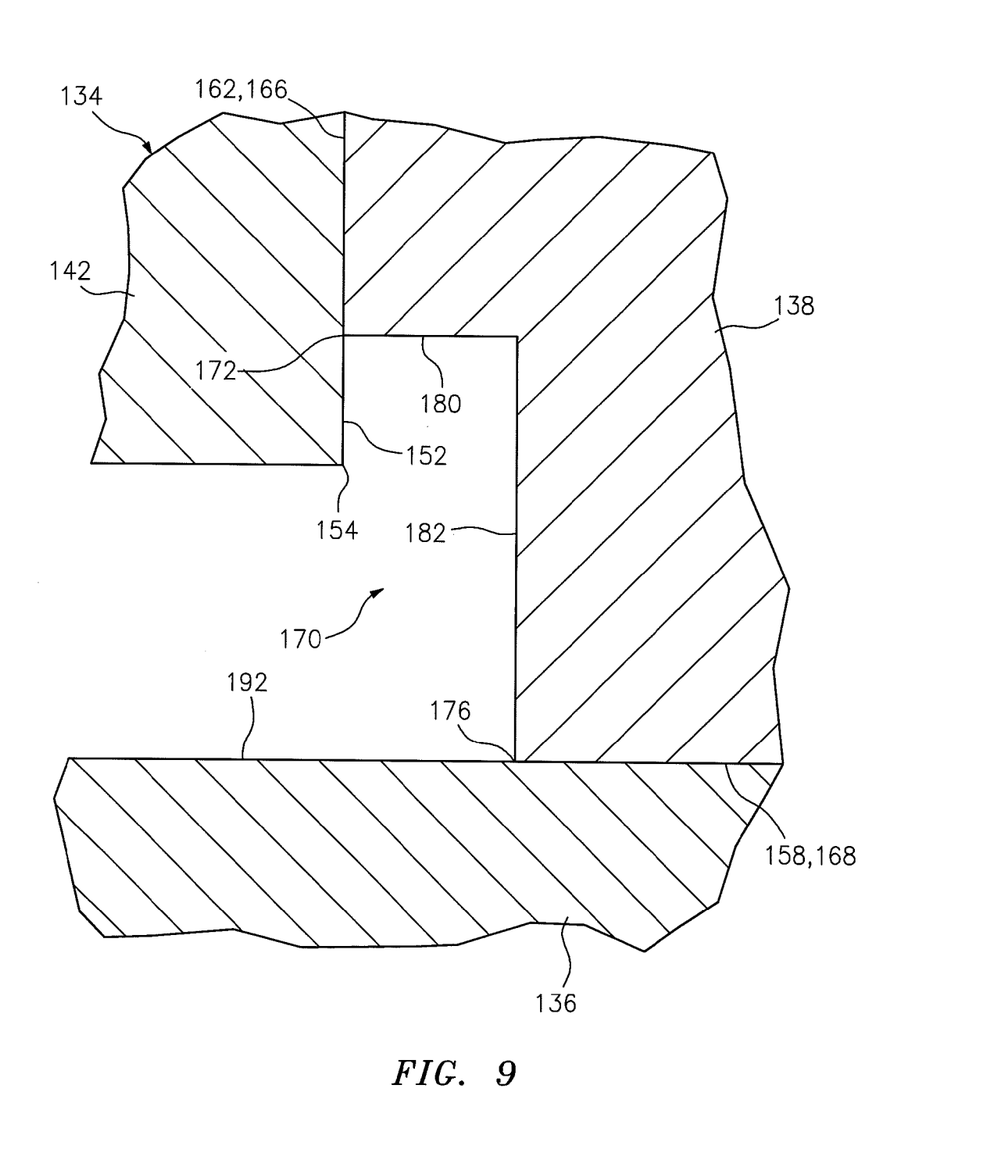
FIG. 9 is another enlarged sectional illustration of a portion of the seal assembly of FIG. 5.

Referring to FIGS. 7 and 8, the notch 170 extends through the respective seal element 138 circumferentially around the axis 102. Referring to FIG. 9, the notch 170 extends into a corner of the respective seal element 138 between and adjacent to the ends 172 and 176. The notch 170 is defined by one or more notch surfaces 180 and 182. The first notch surface 180 extends axially from the inner end 172, in a direction towards the second element surface 168, to the second notch surface 182. The second notch surface 182 extends radially from the first end 176, in a direction towards the first element surface 166, to the first notch surface 180. The second notch surface 182 may be substantially perpendicular to the first notch surface 180, which provides the notch 170 with a substantially rectangular cross-sectional geometry.

Referring to FIG. 6, each of the anti-rotation elements 140 is adapted to prevent a respective one of the seal elements 138 from fully rotating about the axis during turbine engine operation. The anti-rotation elements 140, for example, may prevent the seal elements 138 from rotating more than between approximately zero and +/− approximately ten degrees (10°) around the axis. The anti-rotation element 140 embodiment of FIG. 6 includes a protrusion 184 (e.g., a pin) that extends axially into an aperture 186 (e.g., a slot or hole). The protrusion 184 is configured with the stator 134, and the aperture 186 is configured with the seal element 138.

Referring to FIG. 5, the seal elements 138 are arranged within the channel 146 and mated with the stator 134. A spring element 188 is arranged axially between the seal elements 138 such that the first element surfaces 166 sealingly engage (e.g., contact) the stator surfaces 152. The seal elements 138 are respectively connected to the stator 134 with the anti-rotation elements 140. The rotor 136 is mounted onto the shaft 122, 124. The rotor 136 is arranged within and mated with the seal elements 138. Spring elements 190 may respectively squeeze the seal elements 138 against the rotor 136 such that the second element surfaces 168 sealingly engage a radial outer surface 192 of the rotor 136. The inner sides 150 are radially separated from the inner surface 192 by respective radial gaps.

The rotor 136 rotates with the shaft 122, 124 about the axis during turbine engine operation. Under certain conditions, shaft runout may cause the rotor 136 to radially shift relative to the axis and the stator 134. This shifting of the rotor 136 may in turn cause one or more of the seal elements 138 to radially shift relative to the stator 134. Referring to FIG. 6, the seal assembly 130 may accommodate this radial shifting since each stator surface 152 extends radially beyond the ends 172 and 174. In particular, each of the stator surfaces 152 radially overlaps a portion of the respective notch 170 as well as a gap between the respective seal element 138 and the base 144. The first element surfaces 166 therefore may substantially maintain full engagement with the stator surfaces 152 during shaft runout. Maintaining full engagement may enable each first element end 162 to wear substantially uniformly, which may prevent fractures in the seal element 138 that may increase fluid leakage through the seal assembly 130.

Figure 10:
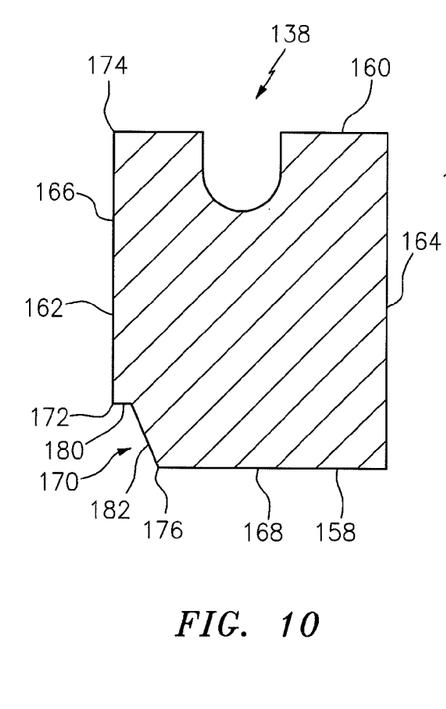
FIG. 10 is a sectional illustration of an annular seal element.
Figure 11:
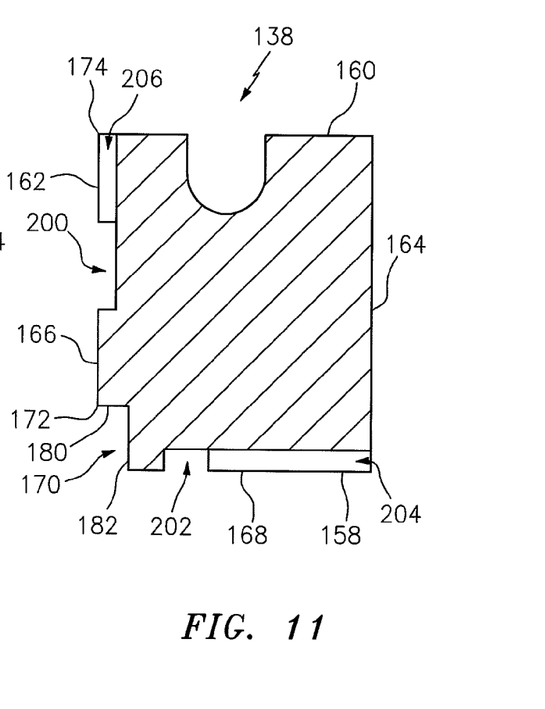
FIG. 11 is a sectional illustration of an alternate embodiment annular seal element.

One or more seal elements 138 may have various geometries and configurations other than that described above. In some embodiments, for example as illustrated in FIG. 7, one or more of the seal elements 138 may each include a plurality of arcuate seal element segments 194. In other embodiments, for example as illustrated in FIG. 8, one or more of the seal elements 138 may each be configured from a unitary body 196 with (or without) a radial expansion slot 198. In some embodiments, for example as illustrated in FIG. 10, the second notch surface 182 may be obtusely (or acutely) angled relative to the first notch surface 180. In some embodiments, for example as illustrated in FIG. 11, one or more of the seal elements 138 may include one or more circumferential (e.g., annular) channels 200 and 202, one or more axial channels 204 and/or one or more radial channels 206. The circumferential channel 200 extends axially into the seal element 138 from the first element surface 166. The circumferential channel 202 extends radially into the seal element 138 from the second element surface 168. The axial channels 204 and/or the radial channels 206 are arranged circumferentially around the axis. The axial channels 204 extend radially into the seal element 138 from the second element surface 168. The axial channels 204 may extend axially through the seal element 138 to the circumferential channel 202. The radial channels 206 extend axially into the seal element 138 from the first element surface 166. The radial channels 206 may extend radially through the seal element 138 to the circumferential channel 200. The present invention therefore is not limited to any particular seal element geometries or configurations.

One or more of the anti-rotation elements 140 may have various configurations other than that described above. In some embodiments, for example, the protrusion 184 may be configured with the seal element 138, and the aperture 186 may be configured with the stator 134. In other embodiments, one or more of the anti-rotation elements 140 may include a fastener that slides within a radially elongated slot. The present invention therefore is not limited to any particular anti-rotation element types or configurations.

The stator 134 and the rotor 136 may have various configurations other than those described above. In some embodiments, for example, the stator may be configured as part of the strut or another turbine engine component. In some embodiments, the rotor may be configured as part of the shaft or another turbine engine component. The present invention therefore is not limited to any particular stator or rotor types or configurations.

A person of skill in the art will recognize the seal assembly 130 may be configured in various types and configurations of turbine engines other than that described above. A person of skill in the art will also recognize the seal assembly 130 may be configured in various types and configurations of rotational equipment other than a turbine engine. The present invention therefore is not limited to any particular rotational equipment types or configurations.

The terms "upstream", "downstream", "inner" and "outer" are used to orientate the components of the seal assembly 130 described above relative to the turbine engine and the axis. A person of skill in the art will recognize, however, the seal assembly components may be utilized in other orientations than those described above. The present invention therefore is not limited to any particular spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A seal assembly with an axis, comprising:
   a stator;
   a rotor; and
   an annular seal element connected to the stator with an anti-rotation element, the seal element including a first element surface, a second element surface and an annular notch, the first element surface axially engaging the stator, the second element surface radially engaging the rotor, and the notch extending into a corner of the seal element between the first and the second element surfaces;
   wherein the stator radially overlaps a portion of the notch; and
   wherein the anti-rotation element comprises a protrusion and an aperture, the protrusion projects axially out from one of the stator and the first element surface and axially into the aperture, and the protrusion extends radially within the aperture;

wherein the notch is partially formed by a first notch surface that is contiguous with a radial innermost end of the first element surface, and the first notch surface extends axially from the radial innermost end towards the second element surface;

wherein the notch is partially formed by a second notch surface that is contiguous with an axial distal end of the first element surface, and the first notch surface extends radially outward from the axial distal end towards the first element surface; and wherein the seal element is configured to maintain full engagement between the first element surface and the stator during rotor runout.

2. The seal assembly of claim 1, wherein the stator includes a stator surface that axially engages the first element surface and extends radially beyond ends of the first element surface.

3. The seal assembly of claim 1, wherein
the stator includes a stator surface that extends radially inwards to an inner end having a first radius; and
the first element surface axially engages the stator surface, and extends radially inwards to an inner end having a second radius that is greater than the first radius.

4. The seal assembly of claim 1, wherein the first and the second notch surfaces form the notch with a substantially rectangular cross-sectional geometry.

5. The seal assembly of claim 1, wherein
the notch is at least partially formed by a first notch surface and a second notch surface;
the first notch surface is substantially perpendicular to the second notch surface, and extends axially away from the first element surface towards the second notch surface; and
the second notch surface extends radially away from the second element surface towards the first notch surface.

6. The seal assembly of claim 1, wherein the seal element shifts radially relative to the stator.

7. The seal assembly of claim 1, wherein the seal element shifts circumferentially relative to the stator.

8. The seal assembly of claim 1, wherein
the seal element extends axially between opposing element ends and radially from an inner element side to an outer element side;
the first element surface is located at one of the element ends; and
the second element surface is located at the inner element side.

9. The seal assembly of claim 8, wherein the stator comprises an annular stator that extends circumferentially around and is radially separated from the rotor.

10. The seal assembly of claim 1, further comprising a turbine engine shaft on which the rotor is mounted.

11. The seal assembly of claim 1, wherein the stator comprises a turbine engine seal housing within which the seal element is arranged.

12. The seal assembly of claim 1, wherein the seal element includes a plurality of arcuate seal element segments.

13. The seal assembly of claim 1, wherein the protrusion is configured with one of the stator and the seal element, and the aperture is respectively configured with another one of the seal element and the stator.

14. The seal assembly of claim 1, further comprising an annular second seal element connected to the stator with an anti-rotation element, wherein
the second seal element includes a first element surface, a second element surface and a notch;
the first element surface of the second seal element axially engages the stator;
the second element surface of the second seal element radially engages the rotor; and
the notch of the second seal element extends into a corner of the second seal element between the respective first and second element surfaces.

15. The seal assembly of claim 1, wherein the notch extends into the seal element so as to form an interior corner in the seal element that is axially recessed into the seal element from the first element surface and radially recessed into the seal element from the second element surface.

16. A seal assembly with an axis, comprising:
a stator including a stator surface;
a rotor; and
a seal element connected to the stator with an anti-rotation element, the seal element including an annular first element surface, an annular second element surface and an annular notch, the first element surface axially engaging the stator surface, the second element surface radially engaging the rotor, and the notch extending into the seal element so as to form a concave corner in the seal element that is axially recessed into the seal element from the first element surface and radially recessed into the seal element from the second element surface;
wherein the stator surface extends radially beyond ends of the first element surface; and
wherein the anti-rotation element comprises a protrusion and an aperture in the seal element, the protrusion projects axially out from the stator and axially into the aperture, and the protrusion radially translatable within the aperture.

17. The seal assembly of claim 16, wherein
the stator surface extends radially inwards to an inner end having a first radius; and
the first element surface extends radially inwards to an inner end having a second radius that is greater than the first radius.

18. A seal assembly for a turbine engine, comprising:
a seal housing;
a rotor mounted to a turbine engine shaft that rotates around an axis; and
a seal element extending circumferentially about the axis and connected to the seal housing with an anti-rotation element, the seal element including a first element surface, a second element surface and a notch, the first element surface axially contacting the seal housing, the second element surface radially contacting the rotor, and the notch extending circumferentially about the axis and into the seal element so as to form an interior corner in the seal element that is axially recessed into the seal element from the first element surface and radially recessed into the seal element from the second element surface;
wherein the seal housing radially overlaps a portion of the notch; and
wherein the anti-rotation element comprises a protrusion and an aperture in the first element surface, the protrusion projects axially out from the seal housing and axially into the aperture, and the protrusion extends radially within the aperture.

19. The seal assembly of claim 18, wherein the seal housing includes a stator surface that axially contacts the first element surface and extends radially beyond ends of the first element surface.

20. The seal assembly of claim 18, wherein
   the notch is partially formed by a first notch surface that is contiguous with a radial distal end of the first element surface, and the first notch surface extends axially from the radial distal end to the second element surface; and
   the notch is partially formed by a second notch surface that is contiguous with an axial distal end of the first element surface, and the first notch surface extends radially outward from the axial distal end to the first element surface.

\* \* \* \* \*